US005943429A

United States Patent [19]
Händel

[11] Patent Number: 5,943,429

[45] Date of Patent: Aug. 24, 1999

[54] SPECTRAL SUBTRACTION NOISE SUPPRESSION METHOD

[75] Inventor: Peter Händel, Uppsala, Sweden

[73] Assignee: Telefonaktiebolaget LM Ericsson, Stockholm, Sweden

[21] Appl. No.: 08/875,412

[22] PCT Filed: Jan. 12, 1996

[86] PCT No.: PCT/SE96/00024

§ 371 Date: Jul. 28, 1997

§ 102(e) Date: Jul. 28, 1997

[87] PCT Pub. No.: WO96/24128

PCT Pub. Date: Aug. 8, 1996

[30] Foreign Application Priority Data

Jan. 30, 1995 [SE] Sweden ................................ 9500321

[51] Int. Cl.$^6$ ................................ H04B 15/00

[52] U.S. Cl. ................................ 381/94.2; 704/226

[58] Field of Search ................ 381/71.1, 71.9–71.14, 381/94.1–94.4, 94.7–94.9, FOR 123, 124, 115, 116, 317, 318; 704/226–228

[56] References Cited

U.S. PATENT DOCUMENTS

| | | | |
|---|---|---|---|
| 4,628,529 | 12/1986 | Borth et al. | 381/317 |
| 4,630,304 | 12/1986 | Borth et al. | 381/317 |
| 4,630,305 | 12/1986 | Borth et al. | 381/317 |
| 4,811,404 | 3/1989 | Vilmur et al. | 381/94.3 |
| 5,133,013 | 7/1992 | Munday | 704/226 |
| 5,432,859 | 7/1995 | Yang et al. | 381/94.3 |
| 5,539,859 | 7/1996 | Robbe et al. | 704/227 |
| 5,544,250 | 8/1996 | Urbanski | 381/94.3 |
| 5,659,622 | 8/1997 | Ashley | 704/227 |
| 5,708,754 | 1/1998 | Wynn | 704/226 |
| 5,727,072 | 3/1998 | Ramen | 704/228 |
| 5,742,927 | 4/1998 | Crozier et al. | 704/226 |
| 5,774,835 | 6/1998 | Ozawa | 704/228 |
| 5,781,883 | 7/1998 | Wynn | 704/226 |
| 5,794,199 | 8/1998 | Rao et al. | 704/226 |
| 5,809,460 | 9/1998 | Hayata et al. | 704/228 |
| 5,812,970 | 9/1998 | Chan et al. | 704/227 |

FOREIGN PATENT DOCUMENTS

| | | | |
|---|---|---|---|
| 6-274196 | 9/1994 | Japan | 704/226 |

*Primary Examiner*—Paul Loomis
*Assistant Examiner*—Xu Mei
*Attorney, Agent, or Firm*—Burns, Doane, Swecker & Mathis, L.L.P.

[57] ABSTRACT

A spectral subtraction noise suppression method in a frame based digital communication system is described. Each frame includes a predetermined number N of audio samples, thereby giving each frame N degrees of freedom. The method is performed by a spectral subtraction function $\hat{H}(w)$ which is based on an estimate of the power spectral density of background noise of non-speech frames and an estimate $\hat{\Phi}_x(w)$ of the power spectral density of speech frames. Each speech frame is approximated by a parametric model that reduces the number of degrees of freedom to less than N. The estimate $\hat{\Phi}_x(w)$ of the power spectral density of each speech frame is estimated from the approximative parametric model.

10 Claims, 7 Drawing Sheets

SPECTRAL SUBTRACTION NOISE SUPPRESSION METHOD

TECHNICAL FIELD

The present invention relates to noise suppresion in digital frame based communication systems, and in particular to a spectral subtraction noise suppression method in such systems.

BACKGROUND

A common problem in speech signal processing is the enhancement of a speech signal from its noisy measurement. One approach for speech enhancement based on single channel (microphone) measurements is filtering in the frequency domain applying spectral subtraction techniques, [1], [2]. Under the assumption that the background noise is long-time stationary (in comparison with the speech) a model of the background noise is usually estimated during time intervals with non-speech activity. Then, during data frames with speech activity, this estimated noise model is used together with an estimated model of the noisy speech in order to enhance the speech. For the spectral subtraction techniques these models are traditionally given in terms of the Power Spectral Density (PSD), that is estimated using classical FFT methods.

None of the abovementioned techniques give in their basic form an output signal with satisfactory audible quality in mobile telephony applications, that is 1. non distorted speech output
2. sufficient reduction of the noise level
3. remaining noise without annoying artifacts In particular, the spectral subtraction methods are known to violate 1 when 2 is fulfilled or violate 2 when 1 is fulfilled. In addition, in most cases 3 is more or less violated since the methods introduce, so called, musical noise.

The above drawbacks with the spectral subtraction methods have been known and, in the literature, several ad hoc modifications of the basic algorithms have appeared for particular speech-in-noise scenarios. However, the problem how to design a spectral subtraction method that for general scenarios fulfills 1–3 has remained unsolved.

In order to highlight the difficulties with speech enhancement from noisy data, note that the spectral subtraction methods are based on filtering using estimated models of the incoming data. If those estimated models are close to the underlying "true" models, this is a well working approach. However, due to the short time stationarity of the speech (10–40 ms) as well as the physical reality surrounding a mobile telephony application (8000 Hz sampling frequency, 0.5–2.0 s stationarity of the noise, etc.) the estimated models are likely to significantly differ from the underlying reality and, thus, result in a filtered output with low audible quality.

EP, A1, 0 588 526 describes a method in which spectral analysis is performed either with Fast Fourier Transformation (FFT) or Linear Predictive Coding (LPC).

SUMMARY

An object of the present invention is to provide a spectral subtraction noise suppresion method that gives a better noise reduction without sacrificing audible quality.

This object is solved by a spectral subtraction noise suppression method in a frame based digital communication system, each frame including a predetermined number N of audio samples, thereby giving each frame N degrees of freedom, wherein a spectral subtraction function $\hat{H}(w)$ is based on an estimate $\hat{\Phi}_v(w)$ of a power spectral density of background noise of non-speech frames and an estimate $\hat{\Phi}_x(w)$ of a power spectral density of speech frames. The method includes the steps of approximating each speech frame by a parametric model that reduces the number of degrees of freedom to less than N; estimating the estimate $\hat{\Phi}_x(w)$ of the power spectral density of each speech frame by a parametric power spectrum estimation method based on the approximative parametric model; and estimating the estimate $\hat{\Phi}_v(w)$ of the power spectral density of each non-speech frame by a non-parametric power spectrum estimation method.

BRIEF DESCRIPTION OF THE DRAWINGS

The invention, together with further objects and advantages thereof, may best be understood by making reference to the following description taken together with the accompanying drawings, in which.

DETAILED DESCRIPTION

The Spectral Subtraction Technique

Figure 1:
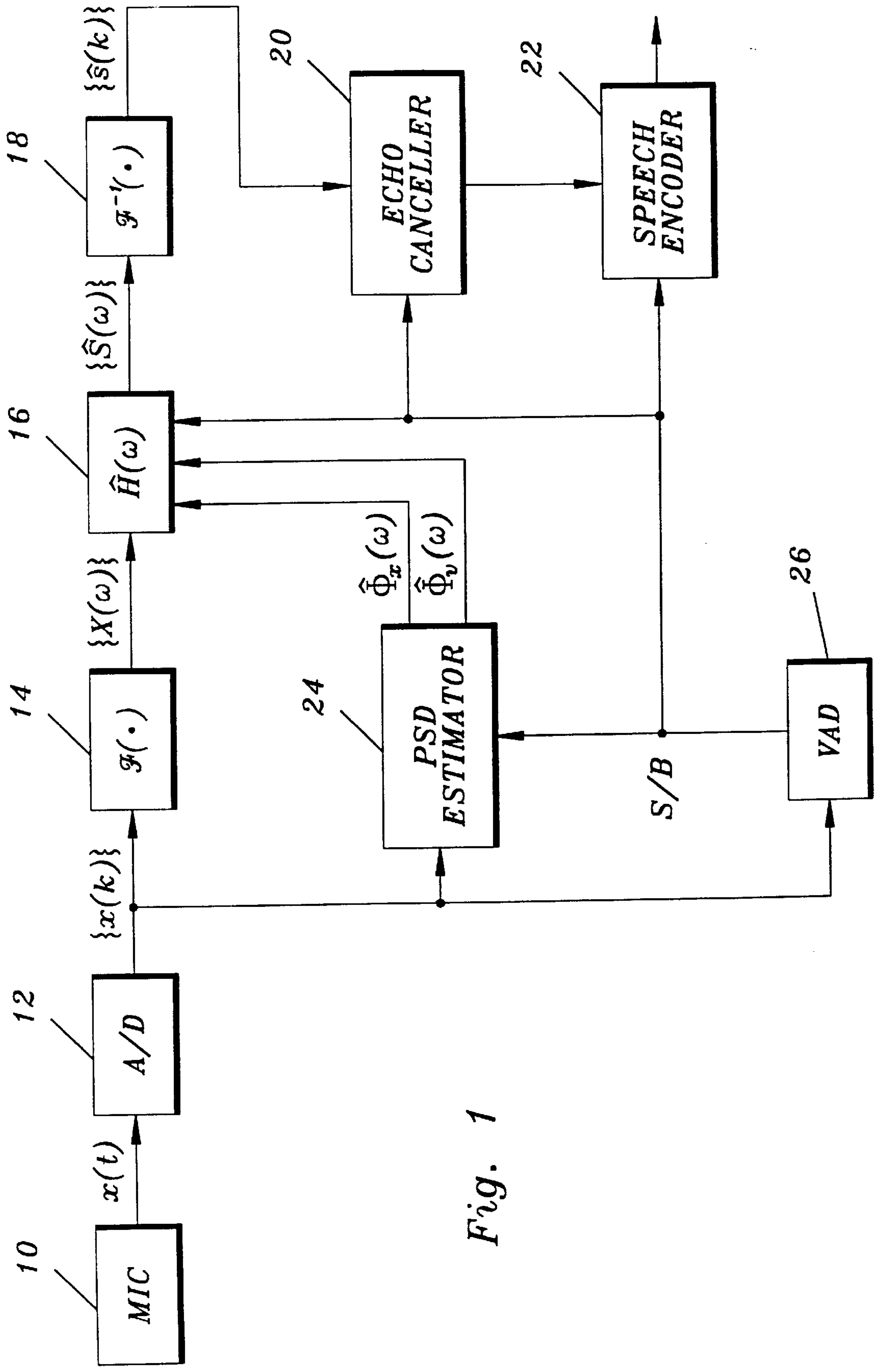
FIG. 1 is a block diagram of a spectral subtraction noise suppression system suitable for performing the method of the present invention.

Consider a frame of speech degraded by additive noise $$x(k)=s(k)+v(k)k=1, \ldots, N \tag{1}$$

where x(k), s(k) and v(k) denote, respectively, the noisy measurement of the speech, the speech and the additive noise, and N denotes the number of samples in a frame.

The speech is assumed stationary over the frame, while the noise is assumed long-time stationary, that is stationary over several frames. The number of frames where v(k) is stationary is denoted by $\tau >> 1$. Further, it is assumed that the speech activity is sufficiently low, so that a model of the noise can be accurately estimated during non-speech activity.

Denote the power spectral densities (PSDs) of, respectively, the measurement, the speech and the noise by $\Phi_x(\omega)$, $\Phi_s(\omega)$ and $\Phi_v(\omega)$, where $$\Phi_x(\omega)=\Phi_s(\omega)+\Phi_v(\omega) \tag{2}$$

Knowing $\Phi_x(\omega)$ and $\Phi_v(\omega)$, the quantities $\Phi_s(\omega)$ and s(k) can be estimated using standard spectral subtraction methods, cf [2], shortly reviewed below Let $\hat{s}(k)$ denote an estimate of s(k). Then, $$\hat{s}(k) = \mathcal{F}^{-1}(H(\omega)x(\omega)) \tag{3}$$

-continued $$X(\omega)=\mathcal{F}(x(k))$$

where $\mathcal{F}(\cdot)$ denotes some linear transform, for example the Discrete Fourier Transform (DFT) and where H (ω) is a real-valued even function in $w\epsilon(0, 2\pi)$ and such that $0 \leqq H(\omega) \leqq 1$. The function H(ω) depends on $\Phi_x(\omega)$ and $\Phi_v(\omega)$. Since H(ω) is real-valued, the phase of $\hat{S}(\omega)=H(\omega)X(\omega)$ equals the phase of the degraded speech. The use of real-valued H(ω) is motivated by the human ears unsensitivity for phase distortion.

In general, $\Phi_x(\omega)$ and $\Phi_v(\omega)$ are unknown and have to be replaced in H(ω) by estimated quantities $\hat{\Phi}_x(\omega)$ and $\hat{\Phi}_v(\omega)$. Due to the non-stationarity of the speech, $\Phi_x(\omega)$ is estimated from a single frame of data, while $\Phi_v(\omega)$ is estimated using data in τ speech free frames. For simplicity, it is assumed that a Voice Activity Detector (VAD) is available in order to distinguish between frames containing noisy speech and frames containing noise only. It is assumed that $\Phi_v(\omega)$ is estimated during non-speech activity by averaging over several frames, for example, using $$\hat{\Phi}_v((\omega))^l=\rho\hat{\Phi}_v((\omega))^{l-1}+(1-\rho)\overline{\Phi}_v((\omega)) \tag{4}$$

In (4), $\hat{\Phi}_v(\omega)^l$ is the (running) averaged PSD estimate based on data up to and including frame number l and $\overline{\Phi}_v(\omega)$ is the estimate based on the current frame. The scalar $\rho\epsilon(0, 1)$ is tuned in relation to the assumed stationarity of v(k). An average over τ frames roughly corresponds to ρ implicitly given by $$\frac{2}{1-\rho}=\tau \tag{5}$$

A suitable PSD estimate (assuming no apriori assumptions on the spectral shape of the background noise) is given by $$\overline{\Phi}_v(\omega)=\frac{1}{N}V(\omega)V^*(\omega) \tag{6}$$

where "*" denotes the complex conjugate and where $V(\omega)=\mathcal{F}(v(k))$. With, $\mathcal{F}(\cdot)=\mathrm{FFT}(\cdot)$ (Fast Fourier Transformation), $\overline{\Phi}_v(\omega)$ is the Periodigram and $\hat{\Phi}_v(\omega)$ in (4) is the averaged Periodigram, both leading to asymptotically (N>>1) unbiased PSD estimates with approximative variances $$Var(\overline{\Phi}_v(\omega)) \approx \Phi_v^2(\omega) \tag{7}$$

$$Var(\hat{\Phi}_v(\omega)) \approx \frac{1}{\tau}\Phi_v^2(\omega)$$

A similar expression to (7) holds true for $\hat{\Phi}_x(\omega)$ during speech activity (replacing $\Phi_v^2(\omega)$ in (7) with $\Phi_x^2(\omega)$).

A spectral subtraction noise suppression system suitable for performing the method of the present invention is illustrated in block form in FIG. 1. From a microphone 10 the audio signal x(t) is forwarded to an A/D converter 12. A/D converter 12 forwards digitized audio samples in frame form {x(k)} to a transform block 14, for example a FFT (Fast Fourier Transform) block, which transforms each frame into a corresponding frequency transformed frame {X(ω)}. The transformed frame is filtered by $\hat{H}(\omega)$ in block 16. This step performs the actual spectral subtraction. The resulting signal $\{\hat{S}(\omega)\}$ is transformed back to the time domain by an inverse transform block 18. The result is a frame $\{\hat{s}(k)\}$ in which the noise has been suppressed. This frame may be forwarded to an echo canceler 20 and thereafter to a speech encoder 22. The speech encoded signal is then forwarded to a channel encoder and modulator for transmission (these elements are not shown).

The actual form of $\hat{H}(\omega)$ in block 16 depends on the estimates $\hat{\Phi}_x(\omega)$, $\hat{\Phi}_v(\omega)$, which are formed in PSD estimator 24, and the analytical expression of these estimates that is used. Examples of different expressions are given in Table 2 of the next section. The major part of the following description will concentrate on different methods of forming estimates $\hat{\Phi}_x(\omega)$, $\hat{\Phi}_v(\omega)$ from the input frame {x(k)}.

Figure 2:
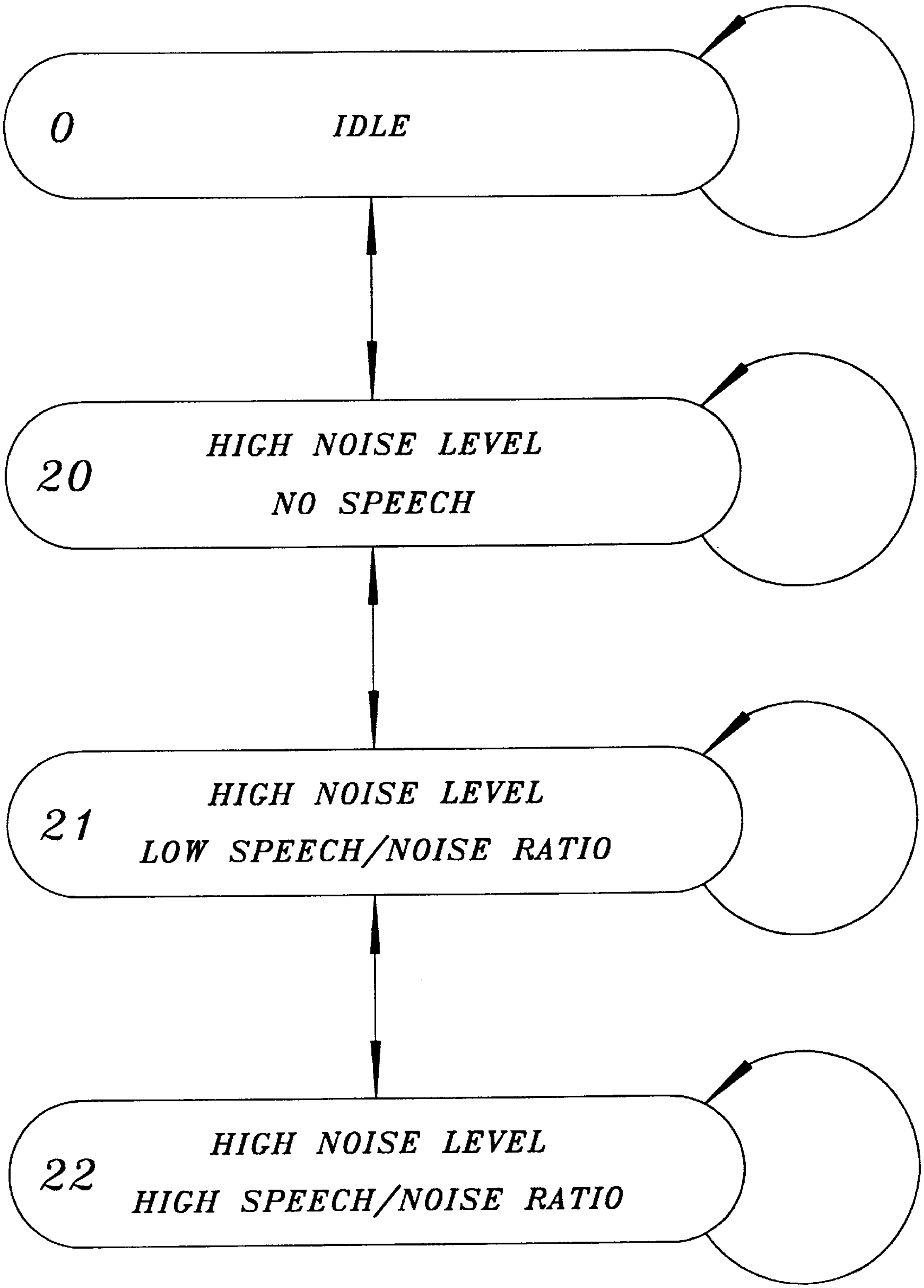
FIG. 2 is a state diagram of a Voice Activity Detector (VAD) that may be used in the system of FIG. 1.

PSD estimator 24 is controlled by a Voice Activity Detector (VAD) 26, which uses input frame {x(k)} to determine whether the frame contains speech (S) or background noise (B). A suitable VAD is described in [5], [6]. The VAD may be implemented as a state machine having the 4 states illustrated in FIG. 2. The resulting control signal S/B is forwarded to PSD estimator 24. When VAD 26 indicates speech (S), states 21 and 22, PSD estimator 24 will form $\hat{\Phi}_x(\omega)$. On the other hand, when VAD 26 indicates non-speech activity (B), state 20, PSD estimator 24 will form $\hat{\Phi}_v(\omega)$. The latter estimate will be used to form $\hat{H}(\omega)$ during the next speech frame sequence (together with $\hat{\Phi}_x(\omega)$ of each of the frames of that sequence).

Signal S/B is also forwarded to spectral subtraction block 16. In this way block 16 may apply different filters during speech and non-speech frames. During speech frames $\hat{H}(\omega)$ is the above mentioned expression of $\hat{\Phi}_x(\omega)$, $\hat{\Phi}_v(\omega)$. On the other hand, during non-speech frames $\hat{H}(\omega)$ may be a constant H ($0 \leqq H \leqq 1$) that reduces the background sound level to the same level as the background sound level that remains in speech frames after noise suppression. In this way the perceived noise level will be the same during both speech and non-speech frames.

Before the output signal $\hat{s}(k)$ in (3) is calculated, $\hat{H}(\omega)$ may, in a preferred embodiment, be post filtered according to $$H_p((\omega))=\max(0.1,\ W((\omega))\overline{H}((\omega)))\forall w \tag{8}$$

TABLE 1

The postfiltering functions

| STATE (st) | $\hat{H}(\omega)$ | COMMENT |
|---|---|---|
| 0 | 1 (∀ω) | $\hat{s}(k) = x(k)$ |
| 20 | 0.316 (∀ω) | muting −10 dB |
| 21 | 0.7 $\hat{H}(\omega)$ | cautios filtering (−3 dB) |
| 22 | $\hat{H}(\omega)$ | |

where $\overline{H}(\omega)$ is calculated according to Table 1. The scalar 0.1 implies that the noise floor is −20 dB.

Furthermore, signal S/B is also forwarded to speech encoder 22. This enables different encoding of speech and background sound.

PSD ERROR ANALYSIS

It is obvious that the stationarity assumptions imposed on s(k) and v(k) give rise to bound on how accurate the estimate $\hat{s}(k)$ is in comparison with the noise free speech signal s(k). In this Section, an analysis technique for spectral subtraction methods is introduced. It is based on first order approximations of the PSD estimates $\hat{\Phi}_x(\omega)$ and, respectively, $\hat{\Phi}_v(\omega)$ (see (11) below ), in combination with approximative (zero order approximations) expression for the accuracy of the introduced deviations. Explicitly, in the following an expression is derived for the frequency domain error of the estimated signal $\hat{s}(k)$, due to the method used (the choice of transfer function $H(\omega)$) and due to the accuracy of the involved PSD estimator. Due to the human ears unsensitivity for phase distortion it is relevant to consider the PSD error, defined by $$\overline{\Phi}_s((\omega))=\hat{\Phi}_s((\omega))-\Phi_s((\omega)) \quad (9)$$

where $$\hat{\Phi}_s((\omega))=\hat{H}^2((\omega))\Phi_x((\omega)) \quad (10)$$

Note that $\overline{\Phi}_s(\omega)$ by construction is an error term describing the difference (in the frequency domain) between the magnitude of the filtered noisy measurement and the magnitude of the speech. Therefore, $\overline{\Phi}_s(\omega)$ can take both positive and negative values and is not the PSD of any time domain signal. In (10), $\hat{H}(\omega)$ denotes an estimate of $H(\omega)$ based on $\hat{\Phi}_x(\omega)$ and $\hat{\Phi}_v(\omega)$. In this Section, the analysis is restricted to the case of Power Subtraction (PS), [2]. Other choices of $\hat{H}(\omega)$ can be analyzed in a similar way (see APPENDIX A–C). In addition novel choices of $\hat{H}(\omega)$ are introduced and analyzed (see APPENDIX D–G). A summary of different suitable choices of $\hat{H}(\omega)$ is given in Table 2.

TABLE 2

Examples of different spectral subtraction methods: Power Subtraction (PS) (standard PS, $\hat{H}_{PS}(\omega)$ for $\delta = 1$), Magnitude Subtraction (MS), spectral subtraction methods based on Wiener Filtering (WF) and Maximum Likelihood (ML) methodologies and Improved Power Subtraction (IPS) in accordance with a preferred embodiment of the present invention.

| $\hat{H}(\omega)$ |
|---|
| $\hat{H}_{\delta PS}(\omega) = \sqrt{1 - \delta\hat{\Phi}_v(\omega)/\hat{\Phi}_x(\omega)}$ |
| $\hat{H}_{MS}(\omega) = 1 - \sqrt{\hat{\Phi}_v(\omega)/\hat{\Phi}_x(\omega)}$ |
| $\hat{H}_{WF}(\omega) = \hat{H}_{PS}^2(\omega)$ |
| $\hat{H}_{ML}(\omega) = \frac{1}{2}(1 + \hat{H}_{PS}(\omega))$ |
| $\hat{H}_{IPS}(\omega) = \sqrt{\hat{G}(\omega)}\,\hat{H}_{PS}(\omega)$ |

By definition, $H(\omega)$ belongs to the interval $0 \leqq H(\omega) \leqq 1$, which not necesarilly holds true for the corresponding estimated quantities in Table 2 and, therfore, in practice half-wave or full-wave rectification, [1], is used.

In order to perform the analysis, assume that the frame length N is sufficiently large (N>>1) so that $\hat{\Phi}_x(\omega)$ and $\hat{\Phi}_v(\omega)$ are approximately unbiased. Introduce the first order deviations $$\hat{\Phi}_x((\omega))=\Phi_x((\omega))+\Delta_x((\omega)) \quad (11)$$

$$\hat{\Phi}_v((\omega))=\Phi_v((\omega))+\Delta_v((\omega))$$

where $\Delta_x(\omega)$ and $\Delta_v(\omega)$ are zero-mean stochastic variables such that $E[\Delta_x(\omega)/\Phi_x(\omega)]^2<<1$ and $E[\Delta_v(\omega)/\Phi_v(\omega)]^2<<1$. Here and in the sequel, the notation $E[\cdot]$ denotes statistical expectation. Further, if the correlation time of the noise is short compared to the frame length, $E[(\overline{\Phi}_v(\omega)^l-\Phi_v(\omega))(\overline{\Phi}_v(\omega)^k-\Phi_v(\omega))]\approx 0$ for $l\neq k$, where $\overline{\Phi}_v(\omega)^l$ is the estimate based on the data in the l-th frame. This implies that $\Delta_x(\omega)$ and $\Delta_v(\omega)$ are approximately independent. Otherwise, if the noise is strongly correlated, assume that $\Phi_v(\omega)$ has a limited (<<N) number of (strong) peaks located at frequencies $w_1, \ldots, w_n$. Then, $E[(\overline{\Phi}_v(\omega)^l-\Phi_v(\omega))(\overline{\Phi}_v(\omega)^k-\Phi_v(\omega))]\approx 0$ holds for $w\neq w_j$ $j=1, \ldots, n$ and $l\neq k$ and the analysis still holds true for $w\neq w_j$ $j=1, \ldots, n$.

Equation (11) implies that asymptotical (N>>1) unbiased PSD estimators such as the Periodogram or the averaged Periodogram are used. However, using asymptotically biased PSD estimators, such as the Blackman-Tukey PSD estimator, a similar analysis holds true replacing (11) with $$\hat{\Phi}_x((\omega))=\Phi_x((\omega))+\Delta_x((\omega))+B_x((\omega))$$

and $$\hat{\Phi}_v((\omega))=\overline{\Phi}_v((\omega))+\Delta_v((\omega))+B_v((\omega))$$

where, respectively, $B_x(\omega)$ and $B_v(\omega)$ are deterministic terms describing the asymptotic bias in the PSD estimators.

Further, equation (11) implies that $\overline{\Phi}_s(\omega)$ in (9) is (in the first order approximation) a linear function in $\Delta_x(\omega)$ and $\Delta_v(\omega)$. In the following, the performance of the different methods in terms of the bias error ($E[\overline{\Phi}_s(\omega)]$) and the error variance ($Var(\overline{\Phi}_s(\omega))$) are considered. A complete derivation will be given for $\hat{H}_{PS}(\omega)$ in the next section. Similar derivations for the other spectral subtraction methods of Table 1 are given in APPENDIX A–G.

ANALYSIS OF $\hat{H}_{PS}(\omega)$ ($\hat{H}_{\delta PS}(\omega)$ for $\delta=1$)

Inserting (10) and $\hat{H}_{PS}(\omega)$ from Table 2 into (9), using the Taylor series expansion $(1+x)^{-1}\simeq 1-x$ and neglecting higher than first order deviations, a straightforward calculation gives $$\overline{\Phi}_s(\omega) \simeq \frac{\Phi_v(\omega)}{\Phi_x(\omega)}\Delta_x(\omega) - \Delta_v(\omega) \quad (12)$$

where "$\simeq$" is used to denote an approximate equality in which only the dominant terms are retained. The quantities $\Delta_x(\omega)$ and $\Delta_v(\omega)$ are zero-mean stochastic variables. Thus, $$E[\overline{\Phi}_s(\omega)] \simeq 0 \quad (13)$$

and $$Var(\overline{\Phi}_s(\omega)) \simeq \frac{\Phi_v^2(\omega)}{\Phi_x^2(\omega)}Var(\hat{\Phi}_x(\omega)) + Var(\hat{\Phi}_v(\omega)) \quad (14)$$

In order to continue we use the general result that, for an asymptotically unbiased spectral estimator $\hat{\Phi}(\omega)$, cf (7)

$$Var(\hat{\Phi}((\omega)))\simeq\gamma((\omega))\Phi^2((\omega)) \quad (15)$$

for some (possibly frequency dependent) variable $\gamma(\omega)$. For example, the Periodogram corresponds to $\gamma(\omega)\approx 1+(\sin wN/N \sin w)^2$, which for N>>1 reduces to $\gamma\approx 1$. Combining (14) and (15) gives $$Var(\overline{\Phi}_s((\omega)))\simeq\gamma\Phi_v^2((\omega)) \quad (16)$$

RESULTS FOR $\hat{H}_{MS}(\omega)$

Similar calculations for $\hat{H}_{MS}(\omega)$ give (details are given in APPENDIX A):

$$E[\overline{\Phi}_s(\omega)] \simeq 2\Phi_v(\omega)\left(1-\sqrt{\frac{\Phi_x(\omega)}{\Phi_v(\omega)}}\right)$$

and

-continued $$Var(\tilde{\Phi}_s(\omega)) \simeq \left(1 - \sqrt{1 + \frac{\Phi_s(\omega)}{\Phi_v(\omega)}}\right)^2 \gamma\Phi_v^2(\omega)$$

RESULTS FOR $\hat{H}_{WF}(\omega)$

Calculations for $\hat{H}_{WF}(\omega)$ give (details are given in APPENDIX B):

$$E[\tilde{\Phi}_s(\omega)] \simeq -\left(1 - \frac{\Phi_v(\omega)}{\Phi_x(\omega)}\right)\Phi_v(\omega)$$

and $$Var(\tilde{\Phi}_s(\omega)) \simeq 4\left(1 - \frac{\Phi_v(\omega)}{\Phi_x(\omega)}\right)^2 \gamma\Phi_v^2(\omega)$$

RESULTS FOR $\hat{H}_{ML}(\omega)$

Calculations for $\hat{H}_{ML}(\omega)$ give (details are given in APPENDIX C):

$$E[\tilde{\Phi}_s(\omega)] \simeq \frac{1}{2}\Phi_v(\omega) - \frac{1}{4}\left(\sqrt{\Phi_x(\omega)} - \sqrt{\Phi_s(\omega)}\right)^2$$

and $$Var(\tilde{\Phi}_s(\omega)) \simeq \frac{1}{16}\left(1 + \sqrt{\frac{\Phi_x(\omega)}{\Phi_s(\omega)}}\right)^2 \gamma\Phi_v^2(\omega)$$

RESULTS FOR $\hat{H}_{IPS}(\omega)$

Calculations for $\hat{H}_{IPS}(\omega)$ give ($\hat{H}_{IPS}(\omega)$ is derived in APPENDIX D and analyzed in APPENDIX E):

$$E[\tilde{\Phi}_s(\omega)] \simeq (\overline{G}(\omega) - 1)\Phi_s(\omega)$$

and $$Var(\tilde{\Phi}_s(\omega)) \simeq$$

$$\overline{G}^2(\omega) \times \left(\overline{G}(\omega) + \gamma\Phi_v(\omega)\Phi_v(\omega) + \frac{2\Phi_x(\omega)}{\Phi_s^2(\omega) + \gamma\Phi_v^2(\omega)}\right)^2 \gamma\Phi_v^2(\omega)$$

COMMON FEATURES

For the considered methods it is noted that the bias error only depends on the choice of $\hat{H}(\omega)$, while the error variance depends both on the choice of $\hat{H}(\omega)$ and the variance of the PSD estimators used. For example, for the averaged Periodogram estimate of $\Phi_v(\omega)$ one has, from (7), that $\gamma_v \approx 1/\tau$. On the other hand, using a single frame Periodogram for the estimation of $\Phi_x(\omega)$, one has a $\gamma_x \approx 1$. Thus, for $\tau >> 1$ the dominant term in $\gamma = \gamma_x + \gamma_v$, appearing in the above vriance equations, is $\gamma_x$ and thus the main error source is the single frame PSD estimate based on the the noisy speech.

From the above remarks, it follows that in order to improve the spectral subtraction techniques, it is desirable to decrease the value of $\gamma_x$ (select an appropriate PSD estimator, that is an approximately unbiased estimator with as good performance as possible) and select a "good" spectral subtraction technique (select $\hat{H}(\omega)$). A key idea of the present invention is that the value of $\gamma_x$ can be reduced using physical modeling (reducing the number of degrees of freedom from N (the number of samples in a frame) to a value less than N) of the vocal tract. It is well known that s(k) can be accurately described by an autoregressive (AR) model (typically of order $p \approx 10$). This is the topic of the next two sections.

In addition, the accuracy of $\overline{\Phi}_s(\omega)$ (and, implicitly, the accuracy of $\hat{s}(k)$) depends on the choice of $\hat{H}(\omega)$. New, preferred choices of $\hat{H}(\omega)$ are derived and analyzed in APPENDIX D–G.

SPEECH AR MODELING

In a preferred embodiment of the present invention s(k) is modeled as an autoregressive (AR) process $$s(k) = \frac{1}{A(q^{-1})}\omega(k) \quad k = 1, \ldots, N \tag{17}$$

where $A(q^{-1})$ is a monic (the leading coefficient equals one) p-th order polynomial in the backward shift operator ($q^{-1}w(k) = w(k-1)$, etc.)

$$A(q^{-1}) = 1 + a_1 q^{-1} + \ldots + a_p q^{-p} \tag{18}$$

and w(k) is white zero-mean noise with variance $\sigma_w^2$. At a first glance, it may seem restrictive to consider AR models only. However, the use of AR models for speech modeling is motivated both from physical modeling of the vocal tract and, which is more important here, from physical limitations from the noisy speech on the accuracy of the estimated models.

In speech signal processing, the frame length N may not be large enough to allow application of averaging techniques inside the frame in order to reduce the variance and, still, preserve the unbiasness of the PSD estimator. Thus, in order to decrease the effect of the first term in for example equation (12) physical modeling of the vocal tract has to be used. The AR structure (17) is imposed onto s(k). Explicitly, $$\Phi_x(\omega) = \frac{\sigma_\omega^2}{|A(e^{i\omega})|^2} + \Phi_v(\omega) \tag{19}$$

In addition, $\Phi_v(\omega)$ may be described with a parametric model $$\Phi_v(\omega) = \sigma_v^2 \, |B(e^{i\omega}) \frac{|^2}{|C(e^{i\omega})|^2} \tag{20}$$

where $B(q^{-1})$, and $C(q^{-1})$ are, respectively, q-th and r-th order polynomials, defined similarly to $A(q^{-1})$ in (18). For simplicity a parametric noise model in (20) is used in the discussion below where the order of the parametric model is estimated. However, it is appreciated that other models of background noise are also possible. Combining (19) and (20), one can show that $$x(k) = \frac{D(q^{-1})}{A(q^{-1})C(q^{-1})}\eta(k) \quad k = 1, \ldots, N \tag{21}$$

where $\eta(k)$ is zero mean white noise with variance $\sigma_{\eta hu\ 2}$ and where $D(q^{-1})$ is given by the identity $$\sigma_\eta^2 |D(e^{iw})|^2 = \sigma_w^2 |C(e^{iw})|^2 + \sigma_v^2 |B(e^{iw})|^2 |A(e^{iw})|^2 \tag{22}$$

SPEECH PARAMETER ESTIMATION

Estimating the parameters in (17)–(18) is straightforward when no additional noise is present. Note that in the noise free case, the second term on the right hand side of (22) vanishes and, thus, (21) reduces to (17) after pole-zero cancellations.

Here, a PSD estimator based on the autocorrelation method is sought. The motivation for this is fourfold.

The autocorrelation method is well known. In particular, the estimated parameters are minimum phase, ensuring the stability of the resulting filter.

Using the Levinson algorithm, the method is easily implemented and has a low computational complexity.

An optimal procedure includes a nonlinear optimization, explicitly requiring some initialization procedure. The autocorrelation method requires none.

From a practical point of view, it is favorable if the same estimation procedure can be used for the degraded speech and, respectively, the clean speech when it is available. In other words, the estimation method should be independent of the actual scenario of operation, that is independent of the speech-to-noise ratio.

It is well known that an ARMA model (such as (21)) can be modeled by an infinite order AR process. When a finite number of data are available for parameter estimation, the infinite order AR model has to be truncated. Here, the model used is $$x(k) = \frac{1}{F(q^{-1})}\eta(k) \tag{23}$$

where $F(q^{-1})$ is of order $\bar{p}$. An appropriate model order follows from the discussion below. The approximative model (23) is close to the speech in noise process if their PSDs are approximately equal, that is $$\frac{|D(e^{i\omega})|^2}{|A(e^{i\omega})|^2\ |C(e^{i\omega})|^2} \approx \frac{1}{|F(e^{i\omega})|^2} \tag{24}$$

Based on the physical modeling of the vocal tract, it is common to consider $p=\deg(A(q^{-1}))=10$. From (24) it also follows that $\bar{p}=\deg(F(q^{-1})>>\deg(A(q^{-1}))+\deg(C(q^{-1}))=p+r$, where p+r roughly equals the number of peaks in $\Phi_x(\omega)$. On the other hand, modeling noisy narrow band processes using AR models requires $\bar{p}<<N$ in order to ensure realible PSD estimates. Summarizing, $$p+r<<\bar{p}<<N$$

A suitable rule-of-thumb is given by $\bar{p}\sim\sqrt{N}$. From the above discussion, one can expect that a parametric approach is fruitful when N>>100. One can also conclude from (22) that the flatter the noise spectra is the smaller values of N is allowed. Even if $\bar{p}$ is not large enough, the parametric approach is expected to give reasonable results. The reason for this is that the parametric approach gives, in terms of error variance, significantly more accurate PSD estimates than a Periodogram based approach (in a typical example the ratio between the variances equals 1:8; see below), which significantly reduce artifacts as tonal noise in the output.

The parametric PSD estimator is summarized as follows. Use the autocorrelation method and a high order AR model (model order $\bar{p}>>p$ and $\bar{p}\sim\sqrt{N}$) in order to calculate the AR parameters $\{\hat{f}_1, \ldots, \hat{f}_{\bar{p}}\}$ and the noise variance $\hat{\sigma}_\eta^2$ in (23). From the estimated AR model calculate (in N discrete points corresponding to the frequency bins of $X(\omega)$ in (3)) $\hat{\Phi}_x(\omega)$ according to $$\hat{\Phi}_x(\omega) = \frac{\hat{\sigma}_\eta^2}{\left|\hat{F}(e^{i\omega})\right|^2} \tag{25}$$

Then one of the considered spectral subtraction techniques in Table 2 is used in order to enhance the speech s(k).

Next a low order approximation for the variance of the parametric PSD estimator (similar to (7) for the nonparametric methods considered) and, thus, a Fourier series expansion of s(k) is used under the assumption that the noise is white. Then the asymptotic (for both the number of data (N>>1) and the model order ($\bar{p}$>>1)) variance of $\hat{\Phi}_x(\omega)$ is given by $$\mathrm{Var}\left(\hat{\Phi}_x(\omega)\right) \simeq \frac{2\bar{p}}{N}\Phi_x^2(\omega) \tag{26}$$

The above expression also holds true for a pure (high-order) AR process. From (26) it approximately equals $\gamma_x \approx 2\bar{p}/N$, that, according to the aforementioned rule-of-thumb, approximately equals $\gamma_x \simeq 2/\sqrt{N}$, which should be compared with $\gamma_x \approx 1$ that holds true for a Periodogram based PSD estimator.

As an example, in a mobile telephony hands free environment, it is reasonable to assume that the noise is stationary for about 0.5 s (at 8000 Hz sampling rate and frame length N=256) that gives $\tau \approx 15$ and, thus, $\gamma_v \simeq 1/15$. Further, for $\bar{p}=\sqrt{N}$ we have $\gamma_x = 1/8$.

Figure 3:
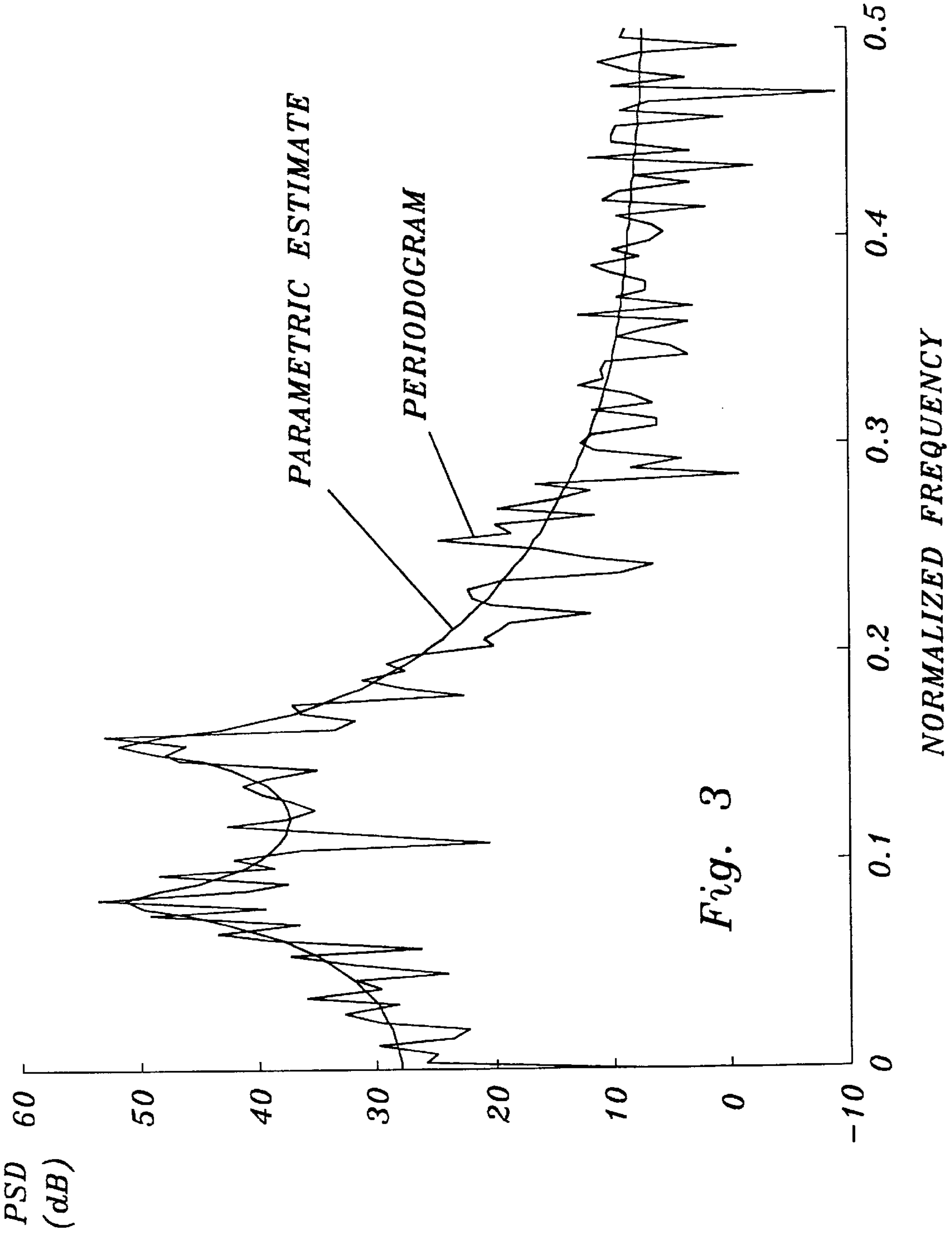
FIG. 3 is a diagram of two different Power Spectrum Density estimates of a speech frame.

FIG. 3 illustrates the difference between a periodogram PSD estimate and a parametric PSD estimate in accordance with the present invention for a typical speech frame. In this example N=256 (256 samples) and an AR model with 10 parameters has been used. It is noted that the parametric PSD estimate $\hat{\Phi}_x(\omega)$ is much smoother than the corresponding periodogram PSD estimate.

Figure 4:
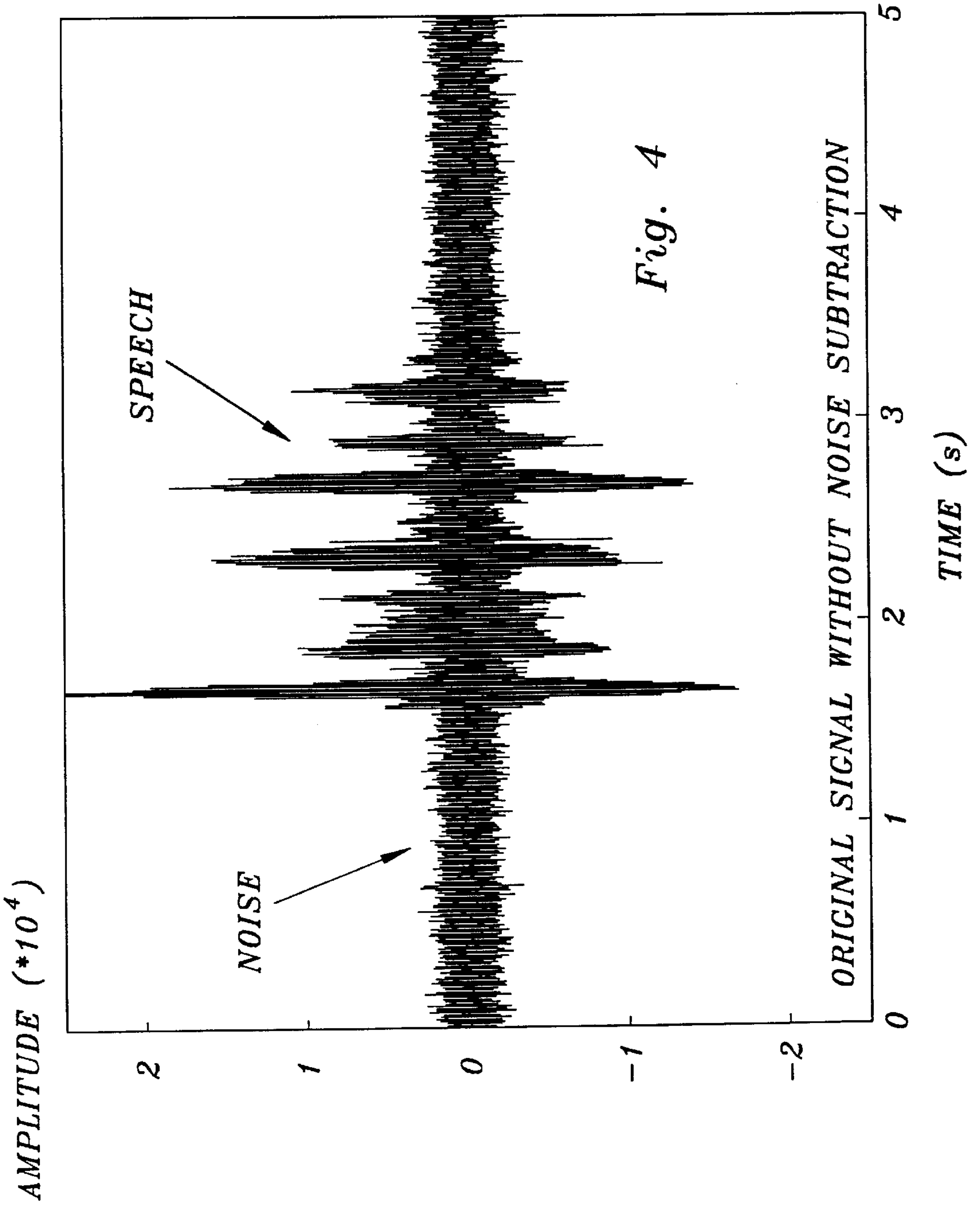
FIG. 4 is a time diagram of a sampled audio signal containing speech and background noise.
Figure 5:
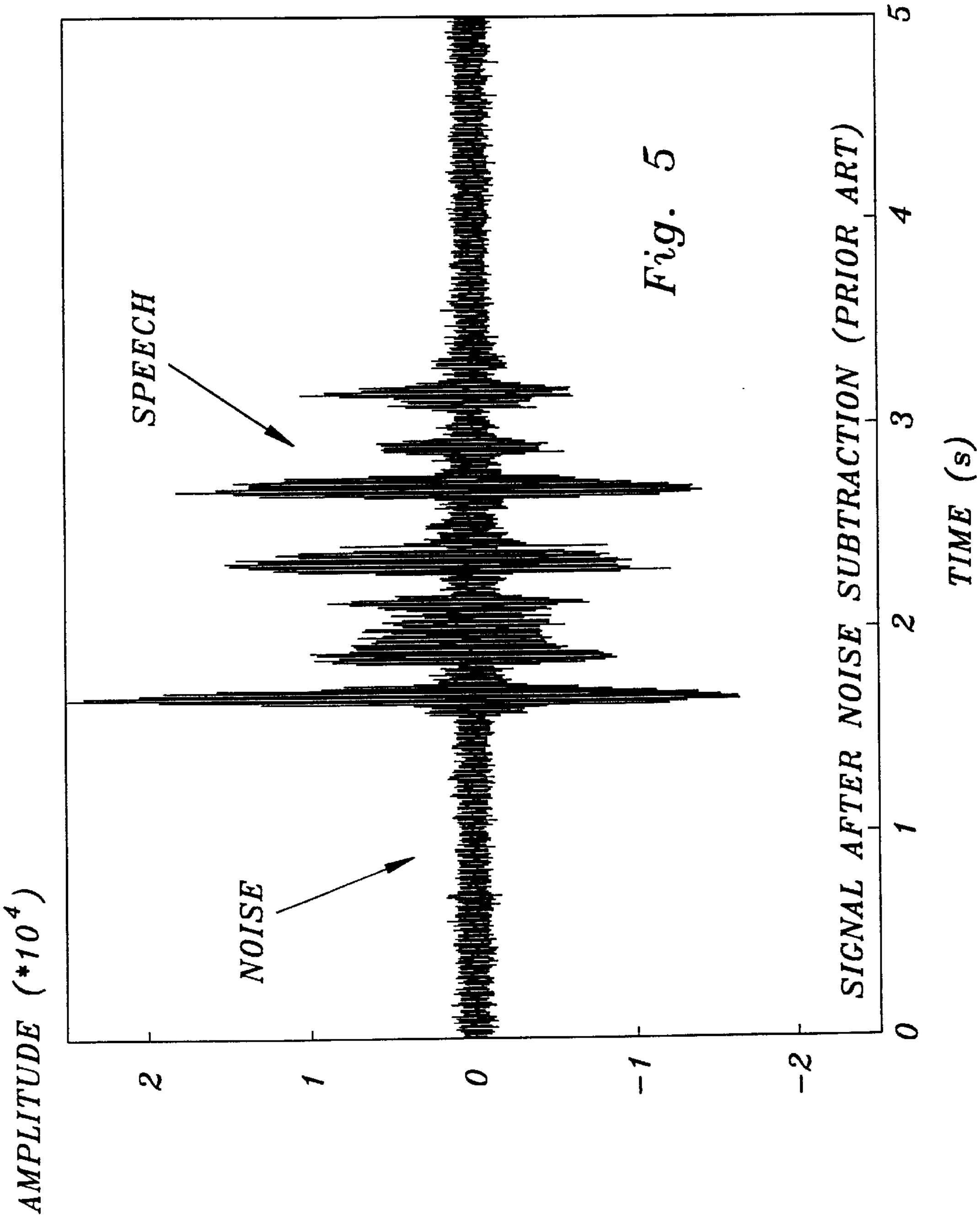
FIG. 5 is a time diagram of the signal in FIG. 3 after spectral noise subtraction in accordance with the prior art.
Figure 6:
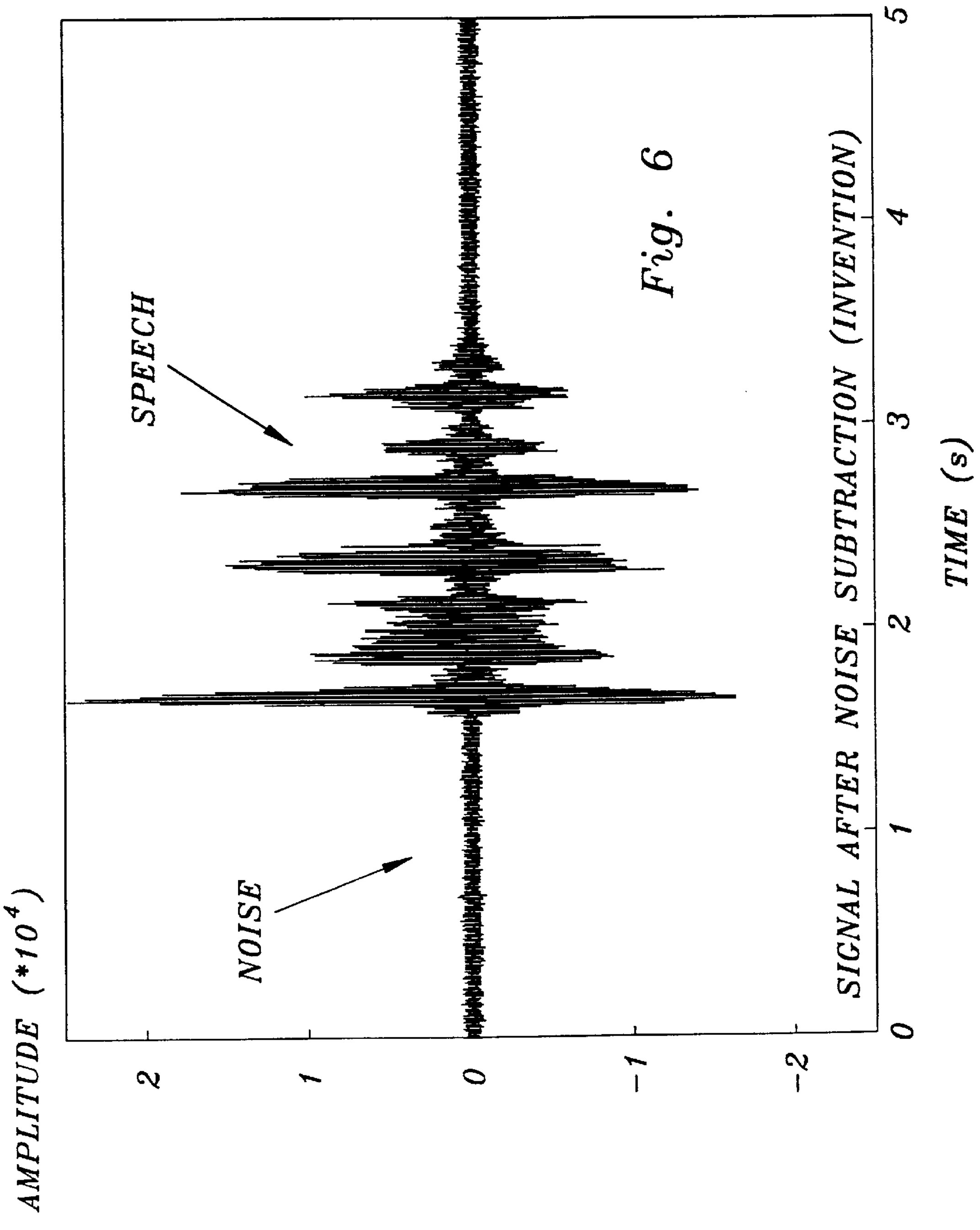
FIG. 6 is a time diagram of the signal in FIG. 3 after spectral noise subtraction in accordance with the present invention.

FIG. 4 illustrates 5 seconds of a sampled audio signal containing speech in a noisy background. FIG. 5 illustrates the signal of FIG. 4 after spectral subtraction based on a periodogram PSD estimate that gives priority to high audible quality. FIG. 6 illustrates the signal of FIG. 4 after spectral subtraction based on a parametric PSD estimate in accordance with the present invention.

A comparison of FIG. 5 and FIG. 6 shows that a significant noise suppression (of the order of 10 dB) is obtained by the method in accordance with the present invention. (As was noted above in connection with the description of FIG. 1 the reduced noise levels are the same in both speech and non-speech frames.) Another difference, which is not apparent from FIG. 6, is that the resulting speech signal is less distorted than the speech signal of FIG. 5.

The theoretical results, in terms of bias and error variance of the PSD error, for all the considered methods are summarized in Table 3.

It is possible to rank the different methods. One can, at least, distinguish two criteria for how to select an appropriate method.

First, for low instantaneous SNR, it is desirable that the method has low variance in order to avoid tonal artifacts in $\hat{s}(k)$. This is not possible without an increased bias, and this bias term should, in order to suppress (and not amplify) the frequency regions with low instantaneous SNR, have a negative sign (thus, forcing $\hat{\Phi}_s(\omega)$ in (9) towards zero). The candidates that fulfill this criterion are, respectively, MS, IPS and WF.

Secondly, for high instantaneous SNR, a low rate of speech distortion is desirable. Further if the bias term is dominant, it should have a positive sign. ML, $\bar{\delta}$PS, PS, IPS and (possibly) WF fulfill the first statement. The bias term dominates in the MSE expression only for ML and WF, where the sign of the bias terms are positive for ML and, respectively, negative for WF. Thus, ML, $\bar{\delta}$PS, PS and IPS fulfill this criterion.

ALGORITHMIC ASPECTS

Figure 7:
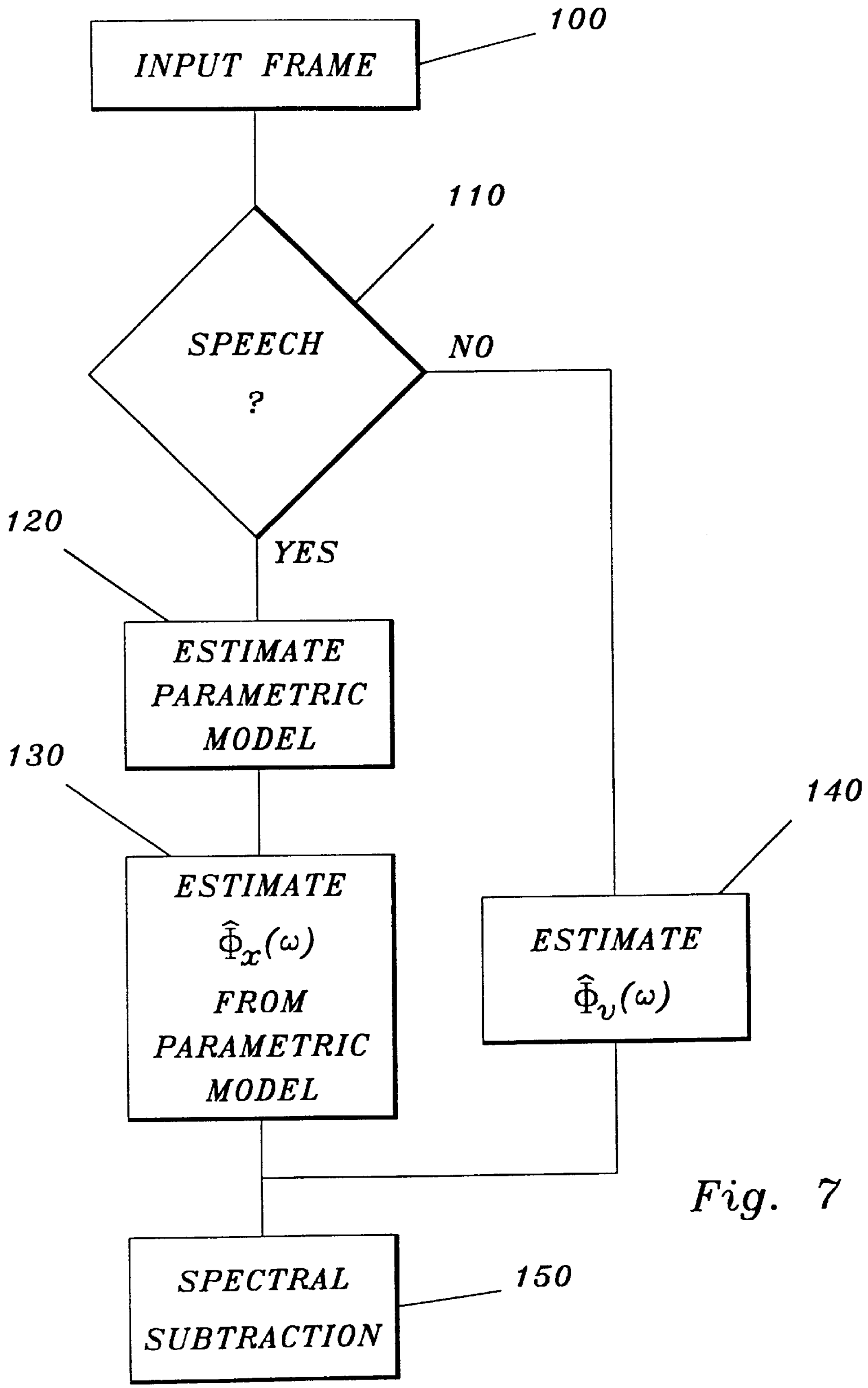
FIG. 7 is a flow chart illustrating the method of the present invention.

In this section preferred embodiments of the spectral subtraction method in accordance with the present invention are described with reference to FIG. 7.

1. Input: $x=\{x(k)|k=1, \ldots, N\}$.
2. Design variables

TABLE 3

Bias and variance expressions for Power Subtraction (PS) (standard PS, $\hat{H}_{PS}(\omega)$ for $\delta = 1$), Magnitude subtraction (MS), Improved Power Subtraction (IPS) and spectral subtraction methods based on Wiener Filtering (WF) and Maximum Likelihood (ML) methodologies. The instantaneous SNR is defined by SNR = $\Phi_s(\omega)/\Phi_v(\omega)$. For PS, the optimal subtraction factor $\bar{\delta}$ is given by (58) and for IPS, $\hat{G}(\omega)$ is given by (45) with $\Phi_x(\omega)$ and $\Phi_v(\omega)$ there replaced by, respectively, $\hat{\Phi}_x(\omega)$ and $\hat{\Phi}_v(\omega)$.

| $\hat{H}(\omega)$ | BIAS $E[\bar{\Phi}_s(\omega)]/\Phi_v(\omega)$ | VARIANCE $Var(\bar{\Phi}_s(\omega))/\gamma\Phi_v^2(\omega)$ |
|---|---|---|
| δPS | $1 - \delta$ | $\delta^2$ |
| MS | $-2(\sqrt{1+SNR} - 1)$ | $(\sqrt{1+SNR} - 1)^2$ |
| IPS | $-\frac{\gamma SNR}{\gamma + SNR^2}$ | $\left(\frac{SNR^2}{SNR^2_{+\gamma}}\right)^2\left(1 + 2\gamma\frac{1_+SNR}{SNR^2_{+\gamma}}\right)^2$ |
| WF | $-\frac{SNR}{SNR_{+1}}$ | $4\left(\frac{SNR}{SNR_{+1}}\right)^2$ |
| ML | $\frac{1}{2} - \frac{1}{4}(\sqrt{SNR+1} - \sqrt{SNR})^2$ | $\frac{1}{16}\left(1 + \sqrt{1 + \frac{1}{SNR}}\right)^2$ |

$\bar{p}$ speech-in-noise model order

ρ running average update factor for $\hat{\Phi}_v(\omega)$

3. For each frame of input data do:

(a) Speech detection (step 110)

The variable Speech is set to true if the VAD output equals st=21 or st=22.

Speech is set to false if st=20. If the VAD output equals st=0 then the algorithm is reinitialized.

(b) Spectral estimation

If Speech estimate $\hat{\Phi}_x(\omega)$:

i. Estimate the coefficients (the polynomial coefficients $\{\hat{f}_1, \ldots, \hat{f}_{\bar{p}}\}$ and the variance $\hat{\sigma}_\eta^2$) of the all-pole model (23) using the autocorrelation method applied to zero mean adjusted input data $\{x(k)\}$ (step 120).

ii. Calculate $\hat{\Phi}_x(\omega)$ according to (25) (step 130). else estimate $\hat{\Phi}_v(\omega)$ (step 140)

i. Update the background noise spectral model $\hat{\Phi}_v(\omega)$ using (4), where $\bar{\Phi}_v(\omega)$ is the Periodogram based on zero mean adjusted and Hanning/Hamming windowed input data x. Since windowed data is used here, while $\hat{\Phi}_x(\omega)$ is based on unwindowed data, $\hat{\Phi}_v(\omega)$ has to be properly normalized. A suitable initial value of $\hat{\Phi}_v(\omega)$ is given by the average (over the frequency bins) of the Periodogram of the first frame scaled by, for example, a factor 0.25, meaning that, initially, a apriori white noise assumption is imposed on the background noise.

(c) Spectral subtraction (step 150)

i. Calculate the frequency weighting function $\hat{H}(\omega)$ according to Table 1.

ii. Possible postfiltering, muting and noise floor adjustment.

iii. Calculate the output using (3) and zero-mean adjusted data $\{x(k)\}$. The data $\{x(k)\}$ may be windowed or not, depending on the actual frame overlap (rectangular window is used for non-overlapping frames, while a Hanning window is used with a 50% overlap).

From the above description it is clear that the present invention results in a significant noise reduction without sacrificing audible quality. This improvement may be explained by the separate power spectrum estimation methods used for speech and non-speech frames. These methods take advantage of the different characters of speech and non-speech (background noise) signals to minimize the variance of the respective power spectrum estimates For non-speech frames $\hat{\Phi}_v(\omega)$ is estimated by a non-parametric power spectrum estimation method, for example an FFT based periodogram estimation, which uses all the N samples of each frame. By retaining all the N degrees of freedom of the non-speech frame a larger variety of background noises may be modeled. Since the background noise is assumed to be stationary over several frames, a reduction of the variance of $\hat{\Phi}_v(\omega)$ may be obtained by averaging the power spectrum estimate over several non-speech frames.

For speech frames $\hat{\Phi}_x(\omega)$ is estimated by a parametric power spectrum estimation method based on a parametric model of speech. In this case the special character of speech is used to reduce the number of degrees of freedom (to the number of parameters in the parametric model) of the speech frame. A model based on fewer parameters reduces the variance of the power spectrum estimate. This approach is preferred for speech frames, since speech is assumed to be stationary only over a frame.

It will be understood by those skilled in the art that various modifications and changes may be made to the present invention without departure from the spirit and scope thereof, which is defined by the appended claims.

APPENDIX A

ANALYSIS OF $\hat{H}_{MS}(\omega)$

Paralleling the calculations for $\hat{H}_{MS}(\omega)$ gives $$\tilde{\Phi}_s(\omega) = \left(1 - \sqrt{\frac{\hat{\Phi}_v(\omega)}{\hat{\Phi}_x(\omega)}}\right)^2 \Phi_x(\omega) - \Phi_s(\omega) \simeq \left(1 - \sqrt{\frac{\Phi_x(\omega)}{\Phi_v(\omega)}}\right)\left(2\Phi_v(\omega) - \frac{\Phi_v(\omega)}{\Phi_x(\omega)}\Delta_x(\omega) + \Delta_v(\omega)\right) \tag{27}$$

where in the second equality, also the Taylor series expansion $\sqrt{1+x} \simeq 1+x/2$ is used. From (27) it follows that the expected value of $\bar{\Phi}_s(\omega)$ is non-zero, given by $$E[\tilde{\Phi}_s(\omega)] \simeq 2\Phi_v(\omega)\left(1 - \sqrt{\frac{\Phi_x(\omega)}{\Phi_v(\omega)}}\right) \tag{28}$$

Further, $$Var(\tilde{\Phi}_s(\omega)) \simeq \left(1 - \sqrt{\frac{\Phi_x(\omega)}{\Phi_v(\omega)}}\right)^2\left(\frac{\Phi_v^2(\omega)}{\Phi_x^2(\omega)}Var(\hat{\Phi}_x(\omega)) + Var(\hat{\Phi}_v(\omega))\right) \tag{29}$$

Combining (29) and (15)

-continued $$\mathrm{Var}(\tilde{\Phi}_s(\omega)) \simeq \left(1-\sqrt{1+\frac{\Phi_s(\omega)}{\Phi_v(\omega)}}\right)^2 \gamma\Phi_v^2(\omega) \tag{30}$$

APPENDIX B

ANALYSIS OF $\hat{H}_{WF}(\omega)$

In this Appendix, the PSD error is derived for speech enhancement based on Wiener filtering, [2]. In this case, $\hat{H}(\omega)$ is given by $$\hat{H}_{WF}(\omega) = \frac{\hat{\Phi}_s(\omega)}{\hat{\Phi}_s(\omega)+\hat{\Phi}_v(\omega)} = \hat{H}_{PS}^2(\omega) \tag{31}$$

Here, $\hat{\Phi}_s(\omega)$ is an estimate of $\Phi_s(\omega)$ and the second equality follows from $\hat{\Phi}_s(\omega)=\hat{\Phi}_x(\omega)-\hat{\Phi}_v(\omega)$. Noting that $$\hat{H}_{WF}^2(\omega) \simeq \frac{\Phi_s(\omega)}{\Phi_x^2(\omega)}\left(\Phi_s(\omega)+2\left\{\frac{\Phi_v(\omega)}{\Phi_x(\omega)}\Delta_x(\omega)-\Delta_v(\omega)\right\}\right) \tag{32}$$

a straightforward calculation gives $$\tilde{\Phi}_s(\omega) \simeq \left(1-\frac{\Phi_v(\omega)}{\Phi_x(\omega)}\right)\times\left(-\Phi_v(\omega)+2\left\{\frac{\Phi_v(\omega)}{\Phi_x(\omega)}\Delta_x(\omega)-\Delta_v(\omega)\right\}\right) \tag{33}$$

From (33), it follows that $$E[\tilde{\Phi}_s(\omega)] \simeq -\left(1-\frac{\Phi_v(\omega)}{\Phi_x(\omega)}\right)\Phi_v(\omega) \tag{34}$$

and $$\mathrm{Var}(\tilde{\Phi}_s(\omega)) \simeq 4\left(1-\frac{\Phi_v(\omega)}{\Phi_x(\omega)}\right)^2\gamma\Phi_v^2(\omega) \tag{35}$$

APPENDIX C

ANALYSIS OF $\hat{H}_{ML}(\omega)$

Characterizing the speech by a deterministic wave-form of unknown amplitude and phase, a maximum likelihood (ML) spectral subtraction method is defined by $$\hat{H}_{ML}(\omega) = \frac{1}{2}\left(1+\sqrt{1-\frac{\hat{\Phi}_v(\omega)}{\hat{\Phi}_x(\omega)}}\right) = \frac{1}{2}\left(1+\hat{H}_{PS}(\omega)\right) \tag{36}$$

Inserting (11) into (36) a straightforward calculation gives $$\hat{H}_{ML}(\omega) \simeq \frac{1}{2}\left(1+\sqrt{\frac{\Phi_s(\omega)}{\Phi_x(\omega)}}\left(1-\frac{\Delta_v(\omega)}{\Phi_s(\omega)}+\frac{\Phi_v(\omega)}{\Phi_x(\omega)}\frac{\Delta_x(\omega)}{\Phi_s(\omega)}\right)^{\frac{1}{2}}\right) \tag{37}$$

$$\simeq \frac{1}{2}\left(1+\sqrt{\frac{\Phi_s(\omega)}{\Phi_x(\omega)}}\right)+$$

-continued $$\frac{1}{4}\frac{1}{\sqrt{\Phi_x(\omega)\Phi_s(\omega)}}\left(\frac{\Phi_v(\omega)}{\Phi_x(\omega)}\Delta_x(\omega)-\Delta_v(\omega)\right)$$

where in the first equality the Taylor series expansion $(1+x)^{-1}\simeq 1-x$ and in the second $\sqrt{1+x}\simeq 1+x/2$ are used. Now, it is straightforward to calculate the PSD error. Inserting (37) into (9)–(10) gives, neglecting higher than first order deviations in the expansion of $\hat{H}_{ML}^2(\omega)$ $$\tilde{\Phi}_s(\omega) \simeq \frac{1}{4}\left(1+\sqrt{\frac{\Phi_s(\omega)}{\Phi_x(\omega)}}\right)^2\Phi_x(\omega)-\Phi_s(\omega)+ \frac{1}{4}\left(1+\sqrt{\frac{\Phi_x(\omega)}{\Phi_s(\omega)}}\right)\left(\frac{\Phi_v(\omega)}{\Phi_x(\omega)}\Delta_x(\omega)-\Delta_v(\omega)\right) \tag{38}$$

From (38), it follows that $$E[\tilde{\Phi}_s(\omega)] \simeq \frac{1}{4}\left(1+\sqrt{\frac{\Phi_s(\omega)}{\Phi_x(\omega)}}\right)^2\Phi_x(\omega)-\Phi_s(\omega) = \frac{1}{2}\Phi_v(\omega)-\frac{1}{4}\left(\sqrt{\Phi_x(\omega)}-\sqrt{\Phi_s(\omega)}\right)^2 \tag{39}$$

where in the second equality (2) is used. Further, $$\mathrm{Var}(\tilde{\Phi}_s(\omega)) \simeq \frac{1}{16}\left(1+\sqrt{\frac{\Phi_x(\omega)}{\Phi_s(\omega)}}\right)^2\gamma\Phi_v^2(\omega) \tag{40}$$

APPENDIX D

DERIVATION OF $\hat{H}_{IPS}(\omega)$

When $\hat{\Phi}_x(\omega)$ and $\hat{\Phi}_v(\omega)$ are exactly known, the squared PSD error is minimized by $H_{PS}(\omega)$, that is $\hat{H}_{PS}(\omega)$ with $\hat{\Phi}_x(\omega)$ and $\hat{\Phi}_v(\omega)$ replaced by $\Phi_x(\omega)$ and $\Phi_v(\omega)$, respectively. This fact follows directly from (9) and (10), viz. $\overline{\Phi}_s(\omega)=[H^2(\omega)\Phi_x(\omega)-\Phi_s(\omega)]^2=0$, where (2) is used in the last equality. Note that in this case $H(\omega)$ is a deterministic quantity, while $\hat{H}(\omega)$ is a stochastic quantity. Taking the uncertainty of the PSD estimates into account, this fact, in general, no longer holds true and in this Section a data-independent weighting function is derived in order to improve the performance of $\hat{H}_{PS}(\omega)$. Towards this end, a variance expression of the form $$\mathrm{Var}(\tilde{\Phi}_s((\omega)))\simeq\xi\gamma\Phi_v^2((\omega)) \tag{41}$$

is considered ($\xi=1$ for PS and $\xi=(1-\sqrt{1+\mathrm{SNR}})^2$ for MS and $\gamma=\gamma_x+\gamma_v$). The variable $\gamma$ depends only on the PSD estimation method used and cannot be affected by the choice of transfer function $\hat{H}(\omega)$. The first factor $\xi$, however, depends on the choice of $\hat{H}(\omega)$. In this section, a data independent weighting function $\overline{G}(\omega)$ is sought, such that $\hat{H}(\omega)=\sqrt{\overline{G}(\omega)}\,\hat{H}_{PS}(\omega)$ minimizes the expectation of the squared PSD error, that is $$\overline{G}(\omega) = \arg\min_{G(\omega)} E[\tilde{\Phi}_s(\omega)]^2 \tag{42}$$

$$\tilde{\Phi}_s(\omega) = G(\omega)\hat{H}_{PS}^2(\omega)\Phi_x(\omega)-\Phi_s(\omega)$$

In (42), $G(\omega)$ is a generic weigthing function. Before we continue, note that if the weighting function $G(\omega)$ is allowed to be data dependent a general class of spectral subtraction techniques results, which includes as special cases many of the commonly used methods, for example, Magnitude Subtraction using $G(\omega)=\hat{H}_{MS}^2(\omega)/\hat{H}_{PS}^2(\omega)$. This observation is, however, of little interest since the optimization of (42) with a data dependent $G(\omega)$ heavily depends on the form of $G(\omega)$. Thus the methods which use a data-dependent weighting function should be analyzed one-by-one, since no general results can be derived in such a case.

In order to minimize (42), a straightforward calculation gives $$\tilde{\Phi}_s(\omega) \simeq (G(\omega)-1)\Phi_s(\omega) + G(\omega)\left(\frac{\Phi_v(\omega)}{\Phi_x(\omega)}\Delta_x(\omega) - \Delta_v(\omega)\right) \tag{43}$$

Taking expectation of the squared PSD error and using (41) gives $$E[\tilde{\Phi}_s((\omega))]^2 \simeq (G((\omega))-1)^2\Phi_s^2((\omega)) + G^2((\omega))\gamma\Phi_v^2((\omega)) \tag{44}$$

Equation (44) is quadratic in $G(\omega)$ and can be analytically minimized. The result reads, $$\overline{G}(\omega) = \frac{\Phi_s^2(\omega)}{\Phi_s^2(\omega)+\gamma\Phi_v^2(\omega)} = \frac{1}{1+\gamma\left(\frac{\Phi_v(\omega)}{\Phi_x(\omega)-\Phi_v(\omega)}\right)^2} \tag{45}$$

where in the second equality (2) is used. Not surprisingly, $\overline{G}(\omega)$ depends on the (unknown) PSDs and the variable $\gamma$. As noted above, one cannot directly replace the unknown PSDs in (45) with the corresponding estimates and claim that the resulting modified PS method is optimal, that is minimizes (42). However, it can be expected that, taking the uncertainty of $\hat{\Phi}_x(\omega)$ and $\hat{\Phi}_v(\omega)$ into account in the design procedure, the modified PS method will perform "better" than standard PS. Due to the above consideration, this modified PS method is denoted by Improved Power Subtraction (IPS). Before the IPS method is analyzed in APPENDIX $E_\tau$ the following remarks are in order.

For high instantaneous SNR (for w such that $\Phi_s(\omega)/\Phi_v(\omega)>>1$) it follows from (45) that $\overline{G}(\omega)\simeq 1$ and, since the normalized error variance $Var(\tilde{\Phi}_s(\omega))/\Phi_s^2(\omega)$, see (41) is small in this case, it can be concluded that the performance of IPS is (very) close to the performance of the standard PS. On the other hand, for low instantaneous SNR (for w such that $\gamma\Phi_v^2(\omega)>>\Phi_s^2(\omega)$), $\overline{G}(\omega)\approx\Phi_s^2(\omega)/(\gamma\Phi_v^2(\omega))$, leading to, cf. (43)

$$E\left[\tilde{\Phi}_s(\omega)\right] \approx -\Phi_s(\omega) \tag{46}$$

and $$\mathrm{Var}\left(\tilde{\Phi}_s(\omega)\right) \approx \frac{\Phi_s^4(\omega)}{\gamma\Phi_v^2(\omega)} \tag{47}$$

However, in the low SNR it cannot be concluded that (46)–(47) are even approximately valid when $\overline{G}(\omega)$ in (45) is replaced by $\hat{G}(\omega)$, that is replacing $\Phi_x(\omega)$ and $\Phi_v(\omega)$ in (45) with their estimated values $\hat{\Phi}_x(\omega)$ and $\hat{\Phi}_v(\omega)$, respectively.

APPENDIX E

ANALYSIS OF $\hat{H}_{IPS}(\omega)$

In this APPENDIX, the IPS method is analyzed. In view of (45), let $\hat{G}(\omega)$ be defined by (45), with $\Phi_v(\omega)$ and $\Phi_x(\omega)$ there replaced by the corresponding estimated quantities. It may be shown that $$\tilde{\Phi}_s(\omega) \simeq (\overline{G}(\omega)-1)\Phi_s(\omega) + \overline{G}(\omega)\left(\frac{\Phi_v(\omega)}{\Phi_x(\omega)}\Delta_x(\omega) - \Delta_v(\omega)\right) \times \left(\overline{G}(\omega) + \gamma\Phi_v(\omega)\Phi_v(\omega) + \frac{2\Phi_x(\omega)}{\Phi_s^2(\omega)+\gamma\Phi_v^2(\omega)}\right) \tag{48}$$

which can be compared with (43). Explicitly, $$E[\tilde{\Phi}_s(\omega)] \simeq (\overline{G}(\omega)-1)\Phi_s(\omega) \tag{49}$$

and $$Var(\tilde{\Phi}_s(\omega)) \simeq \overline{G}^2(\omega) \times \left(\overline{G}(\omega) + \gamma\Phi_v(\omega)\Phi_v(\omega) + \frac{2\Phi_x(\omega)}{\Phi_s^2(\omega)+\gamma\Phi_v^2(\omega)}\right)^2 \gamma\Phi_v^2(\omega) \tag{50}$$

For high SNR, such that $\Phi_s(\omega)/\Phi_v(\omega)>>1$, some insight can be gained into (49)–(50). In this case, one can show that $$E[\tilde{\Phi}_s(\omega)] \simeq 0 \tag{51}$$

and $$Var(\tilde{\Phi}_s(\omega)) \simeq \left(1 + 4\gamma\frac{\Phi_v(\omega)}{\Phi_s(\omega)}\right)\gamma\Phi_v^2(\omega) \tag{52}$$

The neglected terms in (51) and (52) are of order $O((\Phi_v(\omega)/\Phi_s(\omega))^2)$. Thus, as already claimed, the performance of IPS is similar to the performance of the PS at high SNR. On the other hand, for low SNR (for w such that $\Phi_s^2(\omega)/(\gamma\Phi_v^2(\omega))<<1$), $\overline{G}(\omega)\simeq\Phi_s^2(\omega)/(\gamma\Phi_v^2(\omega))$, and $$E[\tilde{\Phi}_s(\omega)] \simeq -\Phi_s(\omega) \tag{53}$$

and $$Var(\tilde{\Phi}_s(\omega)) \simeq 9\frac{\Phi_s^4(\omega)}{\gamma\Phi_v^2(\omega)} \tag{54}$$

Comparing (53)–(54) with the corresponding PS results (13) and (16), it is seen that for low instantaneous SNR the IPS method significantly decrease the variance of $\tilde{\Phi}_s(\omega)$ compared to the standard PS method by forcing $\hat{\Phi}_s(\omega)$ in (9) towards zero. Explicitly, the ratio between the IPS and PS variances are of order $O(\Phi_s^4(\omega)/\Phi_v^4(\omega))$. One may also compare (53)–(54) with the approximative expression (47), noting that the ratio between them equals 9.

APPENDIX F

PS WITH OPTIMAL SUBTRACTION FACTOR $\delta$

An often considered modification of the Power Subtraction method is to consider $$\hat{H}_{\delta PS}(\omega) = \sqrt{1 - \delta(\omega)\frac{\hat{\Phi}_v(\omega)}{\hat{\Phi}_x(\omega)}} \tag{55}$$

where $\delta(\omega)$ is a possibly frequency dependent function. In particular, with $\delta(\omega)=\delta$ for some constant $\delta>1$, the method is often referred as Power Subtraction with oversubtraction. This modification significantly decreases the noise level and reduces the tonal artifacts. In addition, it significantly distorts the speech, which makes this modification useless for high quality speech enhancement. This fact is easily seen from (55) when $\delta >> 1$. Thus, for moderate and low speech to noise ratios (in the w-domain) the expression under the root-sign is very often negative and the rectifying device will therefore set it to zero (half-wave rectification), which implies that only frequency bands where the SNR is high will appear in the output signal $\hat{s}(k)$ in (3). Due to the non-linear rectifying device the present analysis technique is not directly applicable in this case, and since $\delta > 1$ leads to an output with poor audible quality this modification is not further studied.

However, an interesting case is when $\delta(\omega) \leqq 1$, which is seen from the following heuristical discussion. As stated previously, when $\Phi_x(\omega)$ and $\Phi_v(\omega)$ are exactly known, (55) with $\delta(\omega)=1$ is optimal in the sense of minimizing the squared PSD error. On the other hand, when $\Phi_x(\omega)$ and $\Phi_v(\omega)$ are completely unknown, that is no estimates of them are available, the best one can do is to estimate the speech by the noisy measurement itself, that is $\hat{s}(k)=x(k)$, corresponding to the use (55) with $\delta=0$. Due the above two extremes, one can expect that when the unknown $\Phi_x(\omega)$ and $\Phi_v(\omega)$ are replaced by, respectively, $\hat{\Phi}_x(\omega)$ and $\hat{\Phi}_v(\omega)$, the error $E[\overline{\Phi}_s(\omega)]^2$ is minimized for some $\delta(\omega)$ in the interval $0<\delta(\omega)<1$.

In addition, in an empirical quantity, the averaged spectral distortion improvement, similar to the PSD error was experimentally studied with respect to the subtraction factor for MS. Based on several experiments, it was concluded that the optimal subtraction factor preferably should be in the interval that span from 0.5 to 0.9.

Explicitly, calculating the PSD error in this case gives $$\overline{\Phi}_s(\omega) \simeq (1-\delta(\omega))\Phi_v(\omega) + \delta(\omega)\left(\frac{\Phi_v(\omega)}{\Phi_x(\omega)}\Delta_x(\omega) - \Delta_v(\omega)\right) \quad (56)$$

Taking the expectation of the squared PSD error gives $$E[\overline{\Phi}_s((\omega))]^2 \simeq (1-\delta((\omega)))^2\Phi_v{}^2((\omega)) + \delta^2\gamma\Phi_v{}^2((\omega)) \quad (57)$$

where (41) is used. Equation (57) is quadratic in $\delta(\omega)$ and can be analytically minimized. Denoting the optimal value by $\overline{\delta}$, the result reads $$\overline{\delta} = \frac{1}{1+\gamma} < 1 \quad (58)$$

Note that since $\gamma$ in (58) is approximately frequency independent (at least for $N>>1$) also $\overline{\delta}$ is independent of the frequency. In particular, $\overline{\delta}$ is independent of $\Phi_x(\omega)$ and $\Phi_v(\omega)$, which implies that the variance and the bias of $\overline{\Phi}_s(\omega)$ directly follows from (57).

The value of $\overline{\delta}$ may be considerably smaller than one in some (realistic) cases. For example, once again considering $\gamma_v=1/\tau$ and $\gamma_x=1$. Then $\overline{\delta}$ is given by $$\overline{\delta} = \frac{1}{2}\frac{1}{1+1/2\tau}$$

which, clearly, for all $\tau$ is smaller than 0.5. In this case, the fact that $\overline{\delta}<<1$ indicates that the uncertainty in the PSD estimators (and, in particular, the uncertainty in $\hat{\Phi}_x(\omega)$) have a large impact on the quality (in terms of PSD error) of the output. Especially, the use of $\overline{\delta}<<1$ implies that the speech to noise ratio improvement, from input to output signals is small.

An arising question is that if there, similarly to the weighting function for the IPS method in APPENDIX D, exists a data independent weighting function $\overline{G}(\omega)$. In APPENDIX G, such a method is derived (and denoted δIPS).

APPENDIX G

DERIVATION OF $\hat{H}_{\delta IPS}(\omega)$

In this appendix, we seek a data independent weighting factor $\overline{G}(\omega)$ such that $\hat{H}(\omega)=\sqrt{\overline{G}(\omega)}\,\hat{H}_{\delta PS}(\omega)$ for some constant $\delta(0\leqq\delta\leqq 1)$ minimizes the expectation of the squared PSD error, cf (42). A straightforward calculation gives $$\overline{\Phi}_s(\omega) = (G(\omega)-1)\Phi_s(\omega) + G(\omega)(1-\delta)\Phi_v(\omega) \quad (59)$$

$$G(\omega)\delta\left(\frac{\Phi_v(\omega)}{\Phi_x(\omega)}\Delta_x(\omega) - \Delta_v(\omega)\right)$$

The expectation of the squared PSD error is given by $$E[\overline{\Phi}_s((\omega))]^2 = (G((\omega))-1)^2\Phi_s{}^2((\omega)) + G^2((\omega))(1-\delta)^2\Phi_v{}^2((\omega))$$

$$2(G((\omega))-1)\Phi_s((\omega))G((\omega))(1-\delta)\Phi_v((\omega)) + G^2(w)\delta^2\gamma\Phi_v{}^2((\omega)) \quad (60)$$

The right hand side of (60) is quadratic in $G(\omega)$ and can be analytically minimized. The result $\overline{G}(\omega)$ is given by $$\overline{G}(\omega) = \frac{\Phi_s^2(\omega) + \Phi_s(\omega)\Phi_v(\omega)(1-\delta)}{\Phi_s^2(\omega) + 2\Phi_s(\omega)\Phi_v(\omega)(1-\delta) + (1-\delta)^2\Phi_v^2(\omega) + \delta^2\gamma\Phi_v^2(\omega)} = \frac{1}{1+\beta\left(\frac{\Phi_v(\omega)}{\Phi_x(\omega)-\Phi_v(\omega)}\right)^2} \quad (61)$$

where β in the second equality is given by $$\beta = \frac{(1-\delta)^2 + \delta^2\gamma + (1-\delta)\Phi_s(\omega)/\Phi_v(\omega)}{1 + (1-\delta)\Phi_v(\omega)/\Phi_s(\omega)} \quad (62)$$

For $\delta=1$, (61)–(62) above reduce to the IPS method, (45), and for $\delta=0$ we end up with the standard PS. Replacing $\Phi_s(\omega)$ and $\Phi_v(\omega)$ in (61)–(62) with their corresponding estimated quantities $\hat{\Phi}_x(\omega)-\hat{\Phi}_v(\omega)$ and $\hat{\Phi}_v(\omega)$, respectively, give rise to a method, which in view of the IPS method, is denoted δIPS. The analysis of the δIPS method is similar to the analysis of the IPS method, but requires a lot of efforts and tedious straightforward calculations, and is therefore omitted.

CITATIONS

[1] S. F. Boll, "Suppression of Acoustic Noise in Speech Using Spectral Subtraction", *IEEE Transactions on Acoustics, Speech, and Signal Processing*, Vol. ASSP-27, April 1979, pp. 113–120.

[2] J. S. Lim and A. V. Oppenheim, "Enhancement and Bandwidth Compression of Noisy Speech". *Proceedings of the IEEE*, Vol. 67, No. 12, December 1979, pp. 1586–1604.

[3] J. D. Gibson, B. Koo and S. D. Gray, "Filtering of Colored Noise for Speech Enhancement and Coding", *IEEE Transactions on Acoustics, Speech, and Signal Processing*, Vol. ASSP-39, No. 8, August 1991, pp. 1732–1742.

[4] J. H. L Hansen and M. A. Clements, "Constrained Iterative Speech Enhancement with Application to Speech Recognition", *IEEE Transactions on Signal Processing*, Vol. 39, No. 4, April 1991, pp. 795–805.

[5] D. K. Freeman, G. Cosier, C. B. Southcott and I. Boid, "The Voice Activity Detector for the Pan-European Digital Cellular Mobile Telephone Service", 1989 *IEEE International Conference Acoustics, Speech and Signal Processing*, Glasgow, Scotland, Mar. 23–26 1989, pp. 369–372.

[6] PCT application WO 89/08910, British Telecommunications PLC.

What is claimed is:

1. A spectral subtraction noise suppression method in a frame based digital communication system, each frame including a predetermined number N of audio samples, thereby giving each frame N degrees of freedom, wherein a spectral subtraction function $\hat{H}(\omega)$ is based on an estimate $\hat{\Phi}_v(\omega)$ of a power spectral density of background noise of non-speech frames and an estimate $\hat{\Phi}_x(\omega)$ of a power spectral density of speech frames comprising the steps of:

approximating each speech frame by a parametric model that reduces the number of degrees of freedom to less than N;

estimating said estimate $\hat{\Phi}_x(\omega)$ of the power spectral density of each speech frame by a parametric power spectrum estimation method based on the approximative parametric model; and estimating said estimate $\hat{\Phi}_v(\omega)$ of the power spectral density of each non-speech frame by a non-parametric power spectrum estimation method.

2. The method of claim 1, wherein the approximative parametric model is an autoregressive (AR) model.

3. The method of claim 2, wherein the autoregressive (AR) model is approximately of order $\sqrt{N}$.

4. The method of claim 3, wherein the autoregressive (AR) model is approximately of order 10.

5. The method of claim 3, wherein the a spectral subtraction function $\hat{H}(\omega)$ is in accordance with the formula:

$$\hat{H}(\omega) = \sqrt{\hat{G}(\omega)\left(1 - \delta(\omega)\frac{\hat{\Phi}_v(\omega)}{\hat{\Phi}_x(\omega)}\right)}$$

where $\hat{G}(\omega)$ is a weighting function and $\delta(\omega)$ is a subtraction factor.

6. The method of claim 5, wherein $\hat{G}(\omega)=1$.

7. The method of claim 5, wherein $\delta(\omega)$ is a constant $\leqq 1$.

8. The method of claim 3, wherein the a spectral subtraction function $\hat{H}(\omega)$ is in accordance with the formula:

$$\hat{H}(\omega) = 1 - \sqrt{\frac{\hat{\Phi}_v(\omega)}{\hat{\Phi}_x(\omega)}}$$

9. The method of claim 3, wherein the a spectral subtraction function $\hat{H}(\omega)$ is in accordance with the formula:

$$\hat{H}(\omega) = \left(1 - \frac{\hat{\Phi}_v(\omega)}{\hat{\Phi}_x(\omega)}\right)$$

10. The method of claim 3, wherein the spectral subtraction function $\hat{H}(\omega)$ is in accordance with the formula:

$$\hat{H}(\omega) = \frac{1}{2}\left(1 + \sqrt{\left(1 - \frac{\hat{\Phi}_v(\omega)}{\hat{\Phi}_x(\omega)}\right)}\right)$$

* * * * *